United States Patent

[11] 3,589,568

[72] Inventor Charles H. Hoelscher
 Corpus Christi, Tex.
[21] Appl. No. 817,051
[22] Filed Apr. 17, 1969
[45] Patented June 29, 1971
[73] Assignee PPG Industires, INc.
 Pittsburgh, Pa.

[54] ROTATABLE HOLLOW SHAFT, HELIX, AND DRUM FOR FEEDING SOLIDS
 9 Claims, 1 Drawing Fig.
[52] U.S. Cl. .................................................. 222/167,
 222/1, 222/181, 222/152
[51] Int. Cl. .................................................. B67d 5/64,
 B67b 7/00
[50] Field of Search .................................................. 222/381,
 152, 251, 167, 1, 413, 194; 198/215; 103/111 D

[56] References Cited
 UNITED STATES PATENTS
 2,738,960 3/1956 Hoffstetter .................. 222/167

3,053,227 9/1962 Mitchell ...................... 198/215

Primary Examiner—Stanley H. Tollberg
Assistant Examiner—James M. Slattery
Attorney—Chisholm and Spencer ABSTRACT: A finely divided solids feeder is disclosed comprising a chamber having a shaft running through an airtight chamber to a feed bin located outside of the chamber. The hollow shaft, which is covered except for a port near the exit end of the chamber, has a helix running through it; the helix going completely through the hollow shaft of the chamber and into a feed bin located outside of the chamber. The shaft is provided with a second opening in the feed bin so that material can be discharged into the feed bin. The chamber and feed bin are provided with airtight seals and provision is made in the feed bin to introduce inert gas to thereby prevent any possible chemical reaction of materials being fed. The chamber, helix and hollow shaft rotate in the same direction. Rotation of the hollow shaft and tension on the helix permit metered feed.

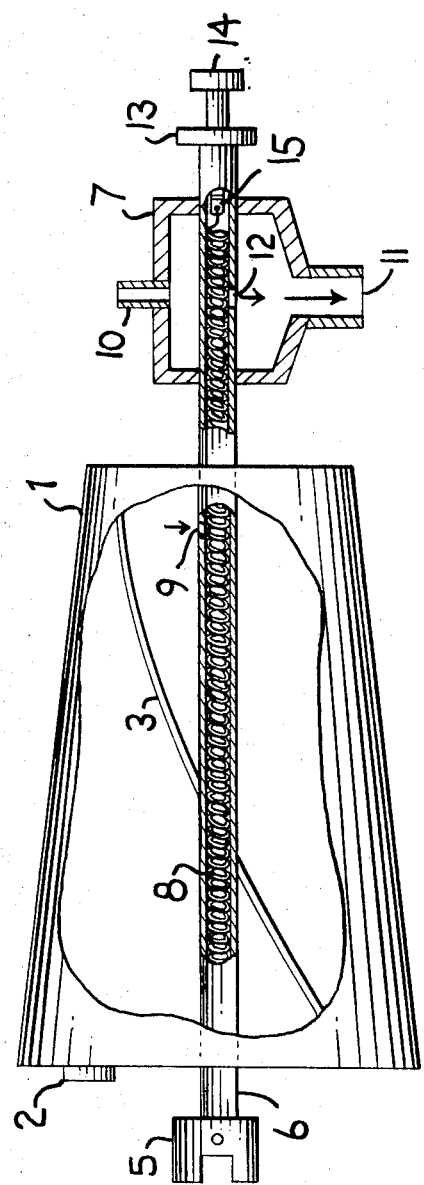
INVENTOR
CHARLES H. HOELSCHER

ROTATABLE HOLLOW SHAFT, HELIX, AND DRUM FOR FEEDING SOLIDS

BACKGROUND OF THE INVENTION

Many chemical and metallurgical operations involve the feeding of finely divided powdered solids. In particular in the feeding of finely divided, powdered metals in a chemical process or metallurgical operation, it is often a desirable goal to provide free flow of the metal particles and constant rates of feed. The capability of varying rates of feed is also desirable in such feeding operations. When soft, or easily malleable metals are employed in chemical or metallurgical operations, free flow of particles of metal can be hindered by frictional forces acting on the metal particles. Thus, in feeding a soft metal in particulate form, for example lithium powder, using a screw conveyor of conventional design, it is found that the metal becomes quickly bonded between the conveyor blades and the walls of the conveyor. Metals of this type typically are found to ball up, plate, layer upon layer, bind against the surfaces exerting force on the particles or otherwise tend to become nonuniform and nonfree-flowing. Typical of metals which are subject to this tendency are lithium, sodium, potassium, calcium, barium and the like and the instant invention is particularly suitable for feeding powdered metals of this type. The apparatus described is also useful in feeding other particulate matter which is subject to distortion when subjected to frictional forces and where free and controlled flow of the material is the desired goal. Thus, soft catalyst materials, polymers, powders, fertilizer nutrients used in bulk blending and other similar materials can be fed using the instant apparatus and method to various operations with ease.

THE INVENTION

In accordance with the present invention a mixing drum is provided, preferably having vanes positioned within it, and having running through the long axis thereof a hollow drive shaft which is firmly affixed and sealed to the drum at both ends. The hollow shaft is provided in its interior and throughout its longitudinal axis with a helix, preferably in the form of a spring. The hollow shaft houses the helix and is provided at the discharge end of the drum with an opening so that particulate matter can enter the hollow shaft and contact the helix. When the shaft and drum are rotated in the same direction, the particles move along the helix to a bin located outside of the drum. The discharge bin is preferably held in a stationary position and the hollow shaft and helix traversing the rotating drum rotate in this stationary bin. The helix traverses both the rotating drum and the fixed bin and the hollow shaft in which it is located in the bin is provided with an opening for the discharge of powdered material entering the helix from the drum. Both the drum and the fixed bin are provided with means to seal them from the atmosphere and in addition the bin is provided with a means for the introduction of an inert gas to prevent any possible chemical reaction of the powders being discharged from the helix into the bin.

For a more complete understanding of the present invention reference is made to the accompanying drawing in which there is shown a rotating drum 1 which is provided with a charging port 2. The drum is equipped with a vane member 3 mounted on the wall of drum 1 for mixing material charged to the vessel. A chuck 5 suitable for attachment to a motor driven shaft is provided at the end of a hollow shaft member 6, which hollow shaft traverses the drum 1 and enters a feed bin 7. The hollow shaft 6 is provided in its interior portion with a helix 8 and the hollow shaft is also provided with an opening 9 for the introduction of material contained in the drum 1 to the helix 8. The bin 7 is provided with an inert gas inlet 10 and a discharge outlet 11 located in the bottom of chamber 7. The hollow shaft member 6 located within the bin 7 is provided with an opening 12 through which powdered particles from the helix 8 are discharged into the bin 7. Provided at the end of the hollow shaft 6 is a lock nut 13 and a tension screw 14. Tension screw 14 is attached at its other end 15 to the helix 8 located in the hollow shaft member 6.

The hollow shaft member 6 is rigidly affixed to the drum 1 and the helix is mounted in the hollow shaft member 6. The drum 1, hollow shaft 6 and helix 8 are so arranged that they rotate simultaneously in the same direction as the drum on chamber 6 is rotated. The metering of material to the bin 7 is readily accomplished by rate changes made in the speed of rotation of the drum. The rate of feed may also be adjusted by applying more or less tension on the helix 8 using the tension screw 14. Thus, by adjusting the tension on the helix 8 and varying the speed of rotation of the drum 1, the feed of material to bin 7 may be readily adapted to a definite quantity per unit period of time and it may also be changed to another value with ease and precision.

The apparatus and method of the instant invention are employed to produce tetramethyl lead by reacting lead, metallic lithium and methyl chloride. The reaction involves charging metallic lithium to the methyl chloride. Methyl lithium is formed which ultimately by reaction with lead leads to the formation of tetramethyl lead. In feeding the metallic lithium to this reaction the lithium powder to be used as the metallic lithium source is charged to the drum 1. Chuck 5 is connected mechanically to a motor and the drum 1, hollow shaft 6 and helix 8 are rotated in the same direction. The vane 3 serves to sweep the powder from the drum wall to the shaft member 6 and its associated opening 9. The lithium powder entering the port 9 is transported along the helix as it rotates but, since the helix and its housing, the hollow shaft 6, are rotating in the same direction, it is not subjected to frictional forces such as would be encountered in a screw conveyor type of propulsion. Thus, the metal powder moves along the helix without any substantial binding of the metal occuring due to frictional distortion of it and is discharged through port 12 to bin 7. The discharge port or chute 11 in bin 7 is connected to the reactor vessel (not shown) in which the lithium metal powder fed is reacted with the methyl chloride and lead to produce the tetramethyl lead. During the charging of the metallic lithium to the chute 11 argon was passed into the bin 7 and a positive argon pressure was maintained in bin 7 during the feed of the lithium.

It has been found in operating this device that since the lithium powder is not forced to bear against any two surfaces unduly, it is moved along the helix 8 in a uniform manner without any binding or balling up occurring and a uniform distribution of feed of lithium powder can be readily obtained in introducing the material to a reaction or storage zone.

While the invention has been described with reference to certain specific embodiments and illustrative methods of operation, it is of course to be understood that the invention can be utilized with respect to the feed of other materials. Thus, while metal powders and lithium in particular have been described as specific materials which may be fed by the method and apparatus of this invention, it is to be understood that other easily fractured or distorted materials can be fed using this invention without resulting in the material balling up or becoming agglomerated. Thus, such diverse materials as organic acids, powdered polymers, alkali metals, alkaline earth metals, lead, and other metals are typical of the material which may effectively be fed, metered or otherwise handled in accordance with this invention.

While in discussing the feeding of lithium to a reaction zone as a specific embodiment of the instant invention, the use of argon and/or helium as the inert has are mentioned, it is obvious that the particular gas that may be employed will depend upon the material to be fed. Generally it is desirable to gas pad with a material that will not react with the material being fed along the helix. In instances where a relatively inert material is being fed, it will be obvious that the use of such a gas purge may be dispensed with.

The apparatus of this invention may be easily adapted to provided metered flow of powdered metal or other material to any operation. This is accomplished with any given material to be fed by measuring in a unit period of time the weight of feed discharged in the chute 11 at a given setting on the tension screw and at a given revolution of the shaft per unit period of time. Once this is determined for one setting of the tension screw, it is a simple matter to change the rate of flow to a different value by calculating the difference resulting from changing the rotational speed of the shaft 6. Several sets of values can be calculated for different sets points on the tension screw 14 and in this manner precise, metered flow of material obtained for a given operation.

I claim:

1. An apparatus for feeding metal powders to a bin comprising a rotating drum, a hollow drive shaft housed in part in said drum and having located within it a helix, an opening provided in the hollow drive shaft positioned in the rotating drum for the introduction of material from the drum into the helix, means for charging material to the drum, means for rotating the hollow shaft, helix and drum simultaneously and in the same direction, a bin located outside of said drum for receiving a portion of the said hollow shaft and helix, means on this said portion of the hollow shaft located in said bin for discharging material contained within the helix into the bin.

2. The apparatus of claim 1 wherein said drum is provided with a vane attached to the drum wall.

3. The apparatus of claim 1 wherein means are provided to apply tension to said helix.

4. The apparatus of claim 1 wherein said drive shaft is centrally located in same drum.

5. A method of feeding an easily deformable powder to a bin in free-flowing state comprising introducing the powder to a drum, rotating the drum to thereby cause the powder to fall against a hollow shaft member traversing the interior of the drum and rotating in the same direction as the drum, feeding the powder from the drum through an opening in the hollow shaft member to a helix located in the hollow shaft, transporting the powder along the helix to a bin positioned outside of the said drum by free flow along the helix by rotating the helix in the same direction as the hollow shaft and the drum and discharging the powder in said bin through an opening in the hollow shaft located in said bin.

6. The method of claim 5 wherein said bin is blanketed with a gas inert to the powder being fed thereto.

7. The method of claim 5 wherein the powder is selected from the group consisting of alkali metals, alkaline earth metals, zinc, lead, organic acids and solid polymers.

8. The method of claim 5 wherein the powder is metallic lithium.

9. The method of claim 8 wherein the inert gas is selected from the group consisting of argon and helium.